Patented Mar. 16, 1937

2,073,683

UNITED STATES PATENT OFFICE 2,073,683

DIPHENYL DERIVATIVES

Walter G. Christiansen, Glen Ridge, N. J., Sidney E. Harris, Lynbrook, N. Y., and John Lee, Zurich, Switzerland, assignors to E. R. Squibb & Sons, New York, N. Y., a corporation of New York No Drawing. Application October 4, 1933, Serial No. 692,124

7 Claims. (Cl. 260—124)

This invention relates to, and has for its object the provision of, certain new compounds, useful as intermediates in the preparation of bactericides.

Compounds of this invention have the general formula

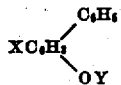

wherein X represents an alkyl, an acyl, or an amino or substituted amino group and Y represents an alkyl when X is an amino group but otherwise represents hydrogen or an alkyl.

EXAMPLES

*2-hydroxy 5-n-amyl diphenyl*

10 g. 2-hydroxy 5-n-valeryl diphenyl, 60 g. amalgamated zinc, 200 cc. 20% hydrochloric acid and 40 cc. alcohol are mixed and refluxed with vigorous agitation for 10–12 hours; after cooling, the oily product is extracted from the aqueous reaction mixture by means of ether or some other suitable solvent; the ether solution is thoroughly washed with water and dried with anhydrous sodium sulfate; the ether is removed by distillation; and the residue being distilled under reduced pressure, the desired compound is collected at 181–183°/6 mm.

Similar reduction of the corresponding acyl hydroxy diphenyls by means of amalgamated zinc and hydrochloric acid yields 2-hydroxy 3-n-butyl diphenyl, boiling at 167°/4 mm.; 2-hydroxy 5-n-butyl diphenyl, boiling at 173–175°/6 mm.; 2-hydroxy 3-n-amyl diphenyl, boiling at 166–171°/5 mm. The compounds 2-methoxy 5-ethyl diphenyl, boiling at 163–166°/7 mm.; 2-methoxy 5-n-propyl diphenyl, boiling at 171–172°/9 mm.; 2-methoxy 5-n-amyl diphenyl, boiling at 178–182°/5 mm.; may be prepared by boiling together under a reflux, with vigorous agitation, one part of the corresponding 2-methoxy 5-acyl diphenyl, three parts amalgamated zinc, three parts concentrated hydrochloric acid, and six parts water; extracting from the acid reaction mixture the methoxy alkyl diphenyl so formed, with a suitable solvent such as ether or benzene; washing free of zinc salts, drying by means of calcium chloride; removing the solvent by distillation; and distilling the residue in vacuo.

*2-hydroxy 3-n-valeryl diphenyl, 2-hydroxy 5-n-valeryl diphenyl*

29.6 g. aluminum chloride is added in small portions to 50.8 g. 2-phenyl-phenyl n-valerate; the mixture is heated at 160° until the evolution of hydrogen chloride ceases and is then cooled; the red glassy product is treated with cold dilute hydrochloric acid; the mixture is warmed on the water-bath until completely decomposed; the precipitated mixture of the desired compounds is thoroughly washed with hydrochloric acid to remove aluminum salts and then with water, and is dissolved in ether or some other suitable solvent; the solution is dried with anhydrous sodium sulfate; the residue is distilled under reduced pressure; the portion boiling above 210°/7 mm. is collected, allowed to solidify by cooling, shaken with several 250 cc. portions of petroleum ether boiling at 60–80°; the undissolved yellow solid residue, 2-hydroxy 5-n-valeryl diphenyl, on recrystallization from a mixture of ether and petroleum ether, forms a white microcrystalline powder melting at 104°; the petroleum ether washings are combined and the petroleum ether removed by distillation; and distillation of the residue under reduced pressure yields 2-hydroxy 3-n-valeryl diphenyl as a faintly yellow oil boiling at 200–210°/5 mm.

*2-hydroxy 3-n-butyryl diphenyl, 2-hydroxy 5-n-butyryl diphenyl*

24 g. 2-phenyl-phenyl n-butyrate is dissolved in 125 g. dry nitrobenzene; 16 g. anhydrous aluminum chloride is added; the reaction vessel, protected from atmospheric moisture, is allowed to stand for two days; sufficient dilute hydrochloric acid is added to dissolve the aluminum salt; the nitrobenzene is removed by steam distillation; after cooling, the aqueous portion of the mass is decanted from the thick oily precipitate of the desired compounds, which is dissolved in ether; the solution is washed thoroughly with dilute hydrochloric acid and water and dried with anhydrous sodium sulfate; the solvent is removed; the residue is distilled under reduced pressure; and the portion boiling at 190–220°/6 mm. is collected; and the desired compounds are separated as in the preceding example, utilization being made of the fact that the 3-n-butyryl compound is much more readily soluble in petroleum ether than the 5-n-butyryl compound.

*2-methoxy 5-propionyl diphenyl*

78 g. 2-methoxy diphenyl is dissolved in 150 cc. dry carbon disulfide; 112 g. aluminum chloride is cautiously added; while 36 g. propionic anhydride is added during half an hour, and for an hour thereafter, the mixture is gently refluxed and stirred, a vigorous evolution of hydrogen chloride taking place; the carbon disulfide is removed by distillation; the hot residue is poured into cracked ice and hydrochloric acid to remove the aluminum; the ketone so liberated is extracted with ether, and is washed with water, caustic soda solution, and again with water to remove the aluminum salts; the ethereal solution is dried with calcium chloride; the ether is distilled off; the residue is allowed to crystallize; and recrystallization from petroleum ether yields the desired compound as a colorless solid melting at 93–94°.

2-methoxy 5-n-valeryl diphenyl

A liquid distilling at 202–204°/4 mm. is prepared by a process exactly analogous to that of the preceding example.

2-hydroxy 5-acetylamino diphenyl 12 g. 2-hydroxy 5-amino diphenyl is suspended in 80 cc. water; 12 cc. acetic anhydride is added in a thin stream, with vigorous stirring; the separated and crystallized purplish tarry matter is filtered off and dissolved in 30% alcohol; the solution is decolorized with carbon; and, the filtered solution being evaporated until turbidity occurs, the desired compound is obtained in the form of colorless needles melting at 156–157° (uncorrected).

2-ethoxy 5-acetylamino diphenyl 2.1 g. sodium (a 20% excess) is dissolved in 65 cc. absolute alcohol; 16 g. 2-hydroxy 5-acetylamino diphenyl is added; the mixture is cooled; 9.25 g. ethyl bromide (a 20% excess) is added; the reaction flask is stoppered and allowed to stand for three hours at room temperature; the mixture is then refluxed for three hours; the alcohol is evaporated off; the mass is ground up with 50 cc. water and filtered; the residue is dissolved in 250 cc. alcohol, and digested on a steam-bath with 3 g. activated carbon until colorless on filtering; addition of two volumes of water to the hot filtrate causes the desired compound to separate out in shining white platelets melting at 156° (uncorrected).

2-ethoxy 5-amino diphenyl hydrochloride 25 g. 2-ethoxy 5-acetylamino diphenyl is refluxed for an hour with 500 cc. 1:1 hydrochloric acid; the boiling clear solution is filtered; on cooling, the desired compound separates out in white needles, which when filtered, washed with alcohol, and dried in vacuo, melt at 216–218° (uncorrected); and neutralization yields the free base, an oily material rapidly oxidizing in air.

2-hydroxy 5-benzalamino diphenyl 10 g. 2-hydroxy 5-amino diphenyl is dissolved in 82.5 cc. normal hydrochloric acid (a 50% excess) and 20 cc. water; 5.6 g. benzaldehyde is added and the mixture vigorously shaken; 11 g. sodium acetate in 50 cc. water is added; the precipitate is broken up and dissolved in alcohol; the solution is digested with activated carbon for four hours at 70° and filtered; addition of water causes the desired compound to precipitate as a noncrystallizing bright yellow powder melting at 99–101° (uncorrected) and forming colloidal gels with most organic solvents.

2-hydroxy 5-isopropyl diphenyl

A mixture of 102 g. 2-hydroxy diphenyl, 20 g. tri-isopropyl borate, 15 g. aluminum chloride, and 500 cc. dry nitrobenzene is heated for three hours on the steam-bath and then poured into dilute hydrochloric acid; the nitrobenzene is removed by steam distillation; the distillation residue is extracted with ether; the extract is washed with dilute hydrochloric acid and water and dried; and fractional distillation yields the desired compound, boiling at 124–128°/2 mm.

2-methoxy 5-isopropyl diphenyl

A mixture of 33 g. 2-methoxy diphenyl, 165 g. nitrobenzene, 12.6 g. tri-isopropyl borate, and 12 g. anhydrous aluminum chloride is allowed to stand over night, heated on the steam-bath for two hours, and then poured into 500 cc. of dilute hydrochloric acid; the nitrobenzene is removed by steam distillation; the residue is extracted with ether; the extract is washed successively with dilute sodium hydroxide, dilute hydrochloric acid, and water, dried with calcium chloride, and fractionally distilled; removal of ether from the residue yields the desired compound, boiling at 140–145°/2 mm.

2-ethoxy 5-carbamido diphenyl 1.5 g. 2-ethoxy 5-amino diphenyl is dissolved in 20 cc. hot water; after cooling, the suspension of crystals is treated with 3 g. solid potassium cyanate and 3 cc. acetic acid, with continuous stirring; an additional 3 g. of potassium cyanate and 3 cc. acetic acid are added and the mixture allowed to stand over night; the crystalline precipitate, on being filtered and recrystallized from alcohol or benzene, yields the desired compound as a crystalline solid melting at 176–177°.

3-hydroxy 6-n-propyl diphenyl 8 g. 3-methoxy 6-n-propyl diphenyl is boiled for seven hours with 75 cc. concentrated hydriodic acid and 50 cc. glacial acetic acid; the mixture is diluted with 6 volumes of water and neutralized with sodium carbonate; the oil is extracted with ether; the extract is shaken repeatedly with dilute sodium hydroxide solution; the alkaline extract is acidified with hydrochloric acid; and the desired compound precipitates as an oil that soon crystallizes and, on recrystallization from a mixture of benzene and petroleum ether, melts at 140–141°.

3-methoxy 6-propionyl diphenyl 35 g. 3-methoxy diphenyl is dissolved in 80 cc. carbon disulfide; 57 g. anhydrous aluminum chloride is added; the mixture, while stirred, is gently refluxed on the steam-bath; 20 g. propionic anhydride is added dropwise during half an hour; stirring and refluxing are continued (about forty-five minutes) until evolution of hydrogen chloride ceases; the carbon disulfide is distilled off; the residue is decomposed by treatment with ice and hydrochloric acid and then warming on the steam-bath; the semi-solid product is extracted with ether; the extract is washed with 5% sodium hydroxide and water and dried with calcium chloride; after removal of the ether, the residue distills at 160–190°/3 mm.; on cooling, the distillate yields the desired compound, which, on recrystallization from petroleum ether, melts at 72°.

3-methoxy 6-n-propyl diphenyl 25 g. 3-methoxy 6-propionyl diphenyl is reduced by boiling with 100 g. amalgamated zinc and 500 cc. 1:1 hydrochloric acid; extraction, washing, and distillation as in the group of examples first above given, yields the desired compound, boiling at 153–170°/3 mm.

3-hydroxy 4-n-propyl diphenyl 3-hydroxy 4-propionyl diphenyl, treated as in the group of examples first above given, yields the desired compound, boiling at 162–163°/3 mm. and, after recrystallization from petroleum ether, melting at 56–56.5°.

3-hydroxy 4-propionyl diphenyl 32 g. 3-phenyl-phenyl propionate is treated with 19.5 g. anhydrous aluminum chloride; the mixture is heated to 160°, and kept thereat until evolution of hydrogen chloride ceases; after cooling, the mass is powdered, and decomposed by warming on the steam-bath with dilute hydrochloric acid; the precipitate is filtered off, washed with water, dried, and extracted thrice with boiling petroleum ether; on cooling, the extracts deposit the desired compound, which on purification by recrystallizing from petroleum ether melts at 109°.

It is to be understood that the foregoing examples are merely illustrative and by no means limitative of the invention, which may be variously otherwise embodied—as with respect to particular compounds and methods of preparing them—within the scope of the appended claims.

We claim—

1. 2-hydroxy 5-n-butyl diphenyl.
2. 2-hydroxy 5-n-valeryl diphenyl.
3. 2-ethoxy 5-acetylamino diphenyl.
4. Compounds of the group consisting of lower-alkyl, lower-aliphatic-acyl, lower-aliphatic-acyl-amino, benzalamino, and carbamido (hydroxy and alkoxy diphenyls) and amino alkoxy diphenyls, such substituent other than hydroxy and alkoxy being attached to a carbon of the hydroxylated or alkoxylated benzene nucleus.
5. Lower-alkyl hydroxy diphenyls, the substituents being attached to carbons of the same benzene nucleus.
6. Lower-aliphatic-acyl hydroxy diphenyls, the substituents being attached to carbons of the same benzene nucleus.
7. Lower-aliphatic-acyl-amino alkoxy diphenyls, the substituents being attached to carbons of the same benzene nucleus.

WALTER G. CHRISTIANSEN.
SIDNEY E. HARRIS.
JOHN LEE.

DISCLAIMER 2,073,683.—*Walter G. Christiansen*, Glen Ridge, N. J., *Sidney E. Harris*, Lynbrook, N. Y., and *John Lee*, Zurich, Switzerland. DIPHENYL DERIVATIVES. Patent dated March 16, 1937. Disclaimer filed September 17, 1937, by the assignee, *E. R. Squibb & Sons*.

Hereby enters this disclaimer to claims 5 and 6 of said Letters Patent and to such portions of claim 4 of said Letters Patent as are directed to lower-alkyl hydroxy diphenyls, lower-aliphatic-acyl hydroxy diphenyls, and lower-aliphatic-acyl alkoxy diphenyls.

[*Official Gazette October 12, 1937.*]

amples first above given, yields the desired compound, boiling at 153–170°/3 mm.

3-hydroxy 4-n-propyl diphenyl 3-hydroxy 4-propionyl diphenyl, treated as in the group of examples first above given, yields the desired compound, boiling at 162–163°/3 mm. and, after recrystallization from petroleum ether, melting at 56–56.5°.

3-hydroxy 4-propionyl diphenyl 32 g. 3-phenyl-phenyl propionate is treated with 19.5 g. anhydrous aluminum chloride; the mixture is heated to 160°, and kept thereat until evolution of hydrogen chloride ceases; after cooling, the mass is powdered, and decomposed by warming on the steam-bath with dilute hydrochloric acid; the precipitate is filtered off, washed with water, dried, and extracted thrice with boiling petroleum ether; on cooling, the extracts deposit the desired compound, which on purification by recrystallizing from petroleum ether melts at 109°.

It is to be understood that the foregoing examples are merely illustrative and by no means limitative of the invention, which may be variously otherwise embodied—as with respect to particular compounds and methods of preparing them—within the scope of the appended claims.

We claim—
1. 2-hydroxy 5-n-butyl diphenyl.
2. 2-hydroxy 5-n-valeryl diphenyl.
3. 2-ethoxy 5-acetylamino diphenyl.
4. Compounds of the group consisting of lower-alkyl, lower-aliphatic-acyl, lower-aliphatic-acyl-amino, benzalamino, and carbamido (hydroxy and alkoxy diphenyls) and amino alkoxy diphenyls, such substituent other than hydroxy and alkoxy being attached to a carbon of the hydroxylated or alkoxylated benzene nucleus.
5. Lower-alkyl hydroxy diphenyls, the substituents being attached to carbons of the same benzene nucleus.
6. Lower-aliphatic-acyl hydroxy diphenyls, the substituents being attached to carbons of the same benzene nucleus.
7. Lower-aliphatic-acyl-amino alkoxy diphenyls, the substituents being attached to carbons of the same benzene nucleus.

WALTER G. CHRISTIANSEN.
SIDNEY E. HARRIS.
JOHN LEE.

DISCLAIMER 2,073,683.—*Walter G. Christiansen*, Glen Ridge, N. J., *Sidney E. Harris*, Lynbrook, N. Y., and *John Lee*, Zurich, Switzerland. DIPHENYL DERIVATIVES. Patent dated March 16, 1937. Disclaimer filed September 17, 1937, by the assignee, *E. R. Squibb & Sons*.

Hereby enters this disclaimer to claims 5 and 6 of said Letters Patent and to such portions of claim 4 of said Letters Patent as are directed to lower-alkyl hydroxy diphenyls, lower-aliphatic-acyl hydroxy diphenyls, and lower-aliphatic-acyl alkoxy diphenyls.

[*Official Gazette October 12, 1937.*]

DISCLAIMER 2,073,683.—*Walter G. Christiansen*, Glen Ridge, N. J., *Sidney E. Harris*, Lynbrook, N. Y., and *John Lee*, Zurich, Switzerland. DIPHENYL DERIVATIVES. Patent dated March 16, 1937. Disclaimer filed September 17, 1937, by the assignee, *E. R. Squibb & Sons*.

Hereby enters this disclaimer to claims 5 and 6 of said Letters Patent and to such portions of claim 4 of said Letters Patent as are directed to lower-alkyl hydroxy diphenyls, lower-aliphatic-acyl hydroxy diphenyls, and lower-aliphatic-acyl alkoxy diphenyls.

[*Official Gazette October 12, 1937*.]